United States Patent [19]
Wheeler et al.

[11] Patent Number: 4,956,405
[45] Date of Patent: * Sep. 11, 1990

[54] OZONE RESISTANT ELASTOMERIC ARTICLES

[75] Inventors: Edward L. Wheeler, Watertown; Robert J. Franko, Beacon Falls, both of Conn.

[73] Assignee: Uniroyal Chemical Company, Inc., Middlebury, Conn.

[*] Notice: The portion of the term of this patent subsequent to Dec. 27, 2005 has been disclaimed.

[21] Appl. No.: 254,006

[22] Filed: Oct. 5, 1988

Related U.S. Application Data

[60] Division of Ser. No. 163,924, Mar. 4, 1988, Pat. No. 4,794,134, which is a continuation-in-part of Ser. No. 90,298, Aug. 28, 1987, Pat. No. 4,794,135.

[51] Int. Cl.$^5$ .................. C08K 5/3492; B32B 9/04; B32B 9/06; B32B 25/06
[52] U.S. Cl. ........................... 524/100; 428/492; 428/500; 209/149; 36/25 R; 12/146 BR
[58] Field of Search ............ 524/100, 186, 254, 255, 524/256, 258, 323; 428/492, 500; 544/197; 209/149; 36/25 R

[56] References Cited

U.S. PATENT DOCUMENTS 4,794,134 12/1988 Wheeler et al. .................. 524/100
4,794,135 12/1988 Wheeler et al. .................. 524/100

Primary Examiner—Kriellion Morgan
Attorney, Agent, or Firm—Raymond D. Thompson

[57] ABSTRACT

Rubber articles subjected to ozone while under dynamic flexing conditions are protected using a novel triazine class of materials, specifically tris-(N-alkyl-p-phenylenediamino)-1,3,5-triazines. Belts, hose, air springs, roofing membranes, etc. are preferred articles of the invention.

10 Claims, No Drawings

OZONE RESISTANT ELASTOMERIC ARTICLES

CROSS-REFERENCE TO RELATED APPLICATIONS

This is a division of application Ser. No. 163,924, filed Mar. 4, 1988, now U.S. Pat. No. 4,794,134 which is a continuation-in-part of U.S. application Ser. No. 90,298 filed Aug. 28, 1987 now U.S. Pat. No. 4794135.

BACKGROUND OF THE INVENTION

This invention relates to new elastomeric articles having enhanced ozone degradation resistance due to the presence therein of novel triazine compounds. Specifically, tris(N-alkyl-p-phenylenediamino)-1,3,5-triazine compounds are used to protect highly unsaturated rubber polymers in the elastomeric body of the articles of manufacture. The exterior surfaces of the articles are the areas subject to ozone degradation: therefore, it is most advantageous to utilize the compounds in the exterior elastomeric layers of the article that are exposed to the environment. The types of elastomeric articles in which the invention is most useful are those subject to severe dynamic flexing during the periods of ozone exposure. Articles such as conveyor belts, power transmission belts, hoses, fluid springs, roofing membranes, bushings, expansion joints, vibration dampers, wire and cable jacketing.

It is well known that ozone causes surface cracking of conventional highly unsaturated rubber vulcanizates when the rubber is placed under strain in an ozone environment. The most severe deterioration occurs when a small number of cracks are formed which grow rapidly into deep, disruptive fissures. These ozone cracks seriously shorten the serviceable life of the article.

Chemical antiozonants have been developed which retard the formation of the ozone cracks occuring under static and dynamic conditions. Examples of antiozonants in common use include: N-phenyl-N'-(1,3-dimethylbutyl)-p-phenylenediamine; N-phenyl-N'-isopropyl-p-phenylenediamine; N-phenyl-N'-(1,4-dimethylpentyl)-p-phenylenediamine; N-phenyl-N'-(1-methylheptyl)-p-phenylenediamine; N-phenyl-N'-cyclohexyl-p-phenylenediamine; mixed diaryl-p-phenylenediamines; N,N'-diphenyl-p-phenylenediamine; N,N'-di-beta-naphthyl-p-phenylenediamine: N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N-phenyl-N'-p-toluenesulfonyl-p-phenylenediamine and blends of these materials.

The use of these well known paraphenylenediamine materials has improved ozone protection under both static and dynamic conditions, however, even the best of the class just described have a very strong tendency to both stain and discolor. The term "stain" or "staining" is herein used to describe the characteristic of a material objectionable in most rubber articles to diffuse through a polymeric substrate and discolor the adjacent surface. This diffusion staining is highly objectionable in most rubber articles, particularly light color articles.

Waxes have been long utilized to inhibit ozone cracking in articles under stress in static condition by incorporating the wax into the rubber compound prior to vulcanization. The wax functions by migrating to the surface of the rubber article to form a film which acts as a physical barrier to the ozone attack. However, during dynamic flexing in service, the wax film is cracked or disrupted and the tendency is for the article to exhibit fewer and more severe ozone cracks than if no wax had been incorporated. Therefore, for many service conditions, the use of wax is impractical due to the dynamic conditions under which the article is expected to perform.

An object of this invention is to provide rubber articles which are more effectively protected against ozone attack at their exterior peripheral surfaces. A further object is to provide ozone protection in a static condition at very low levels and to protect the rubber article during extended aging conditions against ozone attack. Yet another object is to produce a compound which slowly diffuses and does not produce an objectionable brown bloom on the surface of the compound.

The novel arylenediamine substituted triazine compounds of the invention have provided exceptional long term ozone protection under static conditions without using wax. An advantage of the substituted triazine compounds is that it produces a substantially non-staining antiozonant of high molecular weight. A further advantage is that it slowly blooms to the surface of the rubber article. A further advantage is that the triazine compounds of the invention provide outstanding dynamic protection without the use of waxes preferably by blending said triazine compounds with other known antiozonants and antioxidants. Another advantage is that the compounds do not tend to increase scorchiness of the compounded rubber stock in which it is used. This improves processing safety over other paraphenylenediamine antiozonants.

BRIEF DESCRIPTION OF THE INVENTION

The object and advantages of the invention may be obtained using a non-staining, ozone resistant rubber article having an elastomeric body fabricated from at least one ozone degradation prone highly unsaturated polymer and a compound of the general formula:

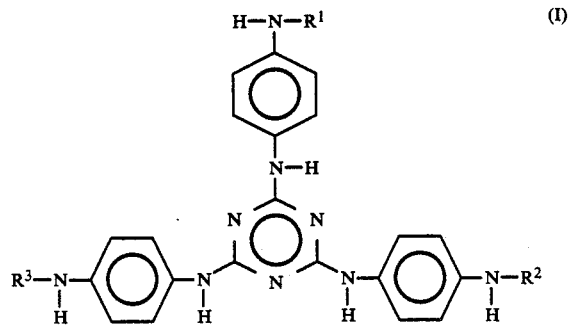

in which $R^1$, $R^2$ and $R^3$ are radicals independently selected from a $C_3-C_{18}$ branched or linear alkyl, or a $C_3-C_{12}$ cycloalkyl or a $C_3-C_{12}$ cycloalkyl substituted with one or more $C_1-C_{12}$ alkyl groups.

The specific advantages of the invention may be most advantageously exploited by utilizing the compound of structure (I) in at least the exterior surfaces of the following elastomeric articles: conveyor belts; power transmission belts including V-belts, timing belts and industrial flat belts: hoses: air springs: rubber roofing membranes; bushings; vibration mounts; bridge bearing pads and other rubber articles subjected to dynamic flexing while exposed to ozone attack.

DETAILED DESCRIPTION OF THE INVENTION

Referring now to structure (I), the preferred compositions are those in which $R^1$, $R^2$ and $R^3$ are linear or branched $C_3$–$C_{18}$ alkyl groups. The alkyl groups more preferred are those with a secondary carbon in the alpha position to the nitrogen. In this configuration, the antiozonant activity of the compound is believed to be enhanced. Therefore, the more preferred alkyl groups are branched chains which provide an alkyl substituent which is in accordance with this configuration. The cycloalkyl or $C_1$–$C_{12}$ alkyl substituted cycloalkyls provide such a alpha carbon configuration as well. The structure of formula I which is most preferred at this time are compounds in which $R^1$, $R^2$ and $R^3$ are $C_6$–$C_8$ branched chain alkyl groups. Examples of some preferred chemicals of the present invention are: 2,4,6-tris(N-1,4-dimethylpentyl-p-phenylenediamino)-1,3,-5-triazine; 2,4,6-tris(N-isopropyl-p-phenylenediamino)-1,3,5-triazine; 2,4,6-tris(N-cyclohexyl-p-phenylenediamino)-1,3,5-triazine; 2,4,6-tris(N-sec-butyl-p-phenylenediamino)-1,3,5-triazine; 2,4,6-tris(N-1,3-dimethylbutyl-p-phenylenediamino)-1,3,5-triazine; 2,4,6-tris(N-1-methylheptyl-p-phenylenediamino)-1,3,5-triazine; 2,4,6-tris(N-2,4-di-tert-butylcyclohexyl-p-phenylenediamino)-1,3,5-triazine; 2,4,6-tris(N-2-sec-butylcyclohexyl-p-phenylenediamino)-1,3,5-triazine; and 2,4,6-tris(1-methyldecyl-p-phenylenediamine)-1,3,5-triazine. The most preferred material is 2,4,6-tris(N-1,4-dimethylpentyl-p-phenylenediamino)-1,3,5-triazine.

The compounds of the invention can be synthesized advantageously by the following general method. Although the reagents may be added in different order as shown in some of the examples, the preferred method is as follows:

The N-alkyl-p-phenylenediamine, which is prepared by methods known to those familiar with the art, is reacted with 2,4,6-tri-halogeno-1,3,5-triazine. A molar equivalent of the preferred tri-halo triazine commonly called cyanuric chloride is added as a powder to a solution of three plus moles of the N-alkyl-p-phenylenediamine in a suitable solvent such as isopropanol, at ambient temperatures with appropriate cooling. The first two halogen atoms are displaced rapidly. The reaction mixture is then heated to 60–80° C. in order to complete the displacement of the third halogen atom. After 4–5 hours heating at 60–80° C. the formation of the 2,4,6-tris-(N-alkyl-p-phenylenediamino)-1,3,5-triazine trihydrochloride is complete.

The process is unique in that the basicity of the alkyl-p-phenylenediamine allows the displaced halogen atom of the cyanuric halide to form the hydrohalide directly thereby enabling isolation of the trihalide and effecting a purification step.

The tris-hydrochloride may be removed by filtration, then reslurried in a suitable water miscible solvent, neutralized with aqueous base such as sodium hydroxide, and crystallized from the aqueous solvent mixture. If the starting N-alkyl-p-phenylenediamine is sufficiently pure, or a less pure product is acceptable, isolation of the tris-hydrochloride is not necessary, and the reaction mixture can be neutralized and the product crystallized and isolated by filtration.

Temperature control of the reaction is of some importance. It is preferred that the first stage of the reaction take place below 30° C. and that the second stage take place at least 30° C. above the first stage. Selection of the optimal temperatures are, of course, dependent upon the identity of the p-phenylenediamine and solvent which is chosen.

Preferred solvents are alcohols although any suitable solvent may be utilized. The term solvent is meant to include an excess of the N-alkyl-p-phenylenediamine which may serve to solvate the reaction product and allow subsequent isolation.

It is noted here that any use of the term "alkyl", in the context of a starting material (i.e., N-alkyl-p-phenylenediamine) or the final substituted triazine compounds of this invention, is deemed to include cycloalkyl and alkyl substituted cycloalkyl structures as well.

The following discussion of compounding guidelines for the invention are generally applicable to any of the plurality of rubber compounds which are used to manufacture the many articles which will be described later. The later description under the heading "Utility in Dynamic Rubber Articles" deals primarily with the structural detail of the articles. This section covers the chemical aspects of the rubber articles.

The compounds of the invention are most advantageously utilized as antiozonants to protect highly unsaturated polymers such as natural or synthetic elastomers. Representative of the highly unsaturated polymers which may be employed in the practice of this invention are diene elastomers. Such elastomers will typically possess an iodine number of between about 100 and about 400, although highly unsaturated rubbers having a higher or a lower (i.e., of 50–100) iodine number may also be employed. Illustrative of the diene elastomers which may be utilized are polymers based on conjugated dienes such as 1,3-butadiene; 2-methyl-1,3-butadiene; 1,3-pentadiene; 2,3-dimethyl-1,3-butadiene; and the like, as well as copolymers of such conjugated dienes with monomers such as styrene, alpha-methylstyrene, acrylonitrile, methacrylonitrile, methyl acrylate, ethyl acrylate, methyl methacrylate, ethyl methacrylate, vinyl acetate and the like. Preferred highly unsaturated rubbers include natural rubber, cis-polyisoprene, polybutadiene, poly(styrene-butadiene), polychloroprene and poly(acrylonitrile-butadiene). Moreover, mixtures of two or more highly unsaturated rubbers may be employed. Also, mixtures of the highly unsaturated rubbers with elastomers having lesser unsaturation (iodine number between 10–100) such as EPDM, EPR, butyl or halogenated butyl rubbers are also very useful in articles of the invention.

U.S. Pat No. 4,645,793 discloses particularly preferred high molecular weight EPDM polymers of this high molecular weight class that have an ethylene:propylene weight ratio of about 50:50 to about 75:25, preferably from 60–40 to about 75:25 and at least about 6 and preferably at least about 7.5, most preferably at least about 9 and up to about 15 weight percent bound non-conjugated diene based on the total EPDM. Suitable such non-conjugated dienes include straight chain and cyclic dienes such as 1,4-hexadiene, ethylidene norbornene, norbornadiene, methylene norbornene, dicyclopentadiene, 2-methyl norbornadiene, 5-vinyl 2 norbornene and the like. Especially preferred among such dienes is ethylidene norbornene. Preferably, the EPDM has a nonconjugated diene content of 7.5–15 weight percent. Methods for production of such EPDM polymers are well documented in the art. Preferably the amount of EPDM polymer in the elastomeric composition is from 15 to about 40 parts by weight per 100 parts by weight of total elastomers.

For ease and efficiency of mixing the polymers, the high molecular weight EPDM polymer is provided as an oil extended polymer prior to mixing with the other polymers. The EPDM may be oil extended by the well-known procedures of oil extending polymers by adding oil to the polymer solution from the polymerization reactors and recovering the oil extended polymer; the oil is selected from the napthenic or paraffinic oils, in amounts from about 50 to about 150 parts by weight of oil per 100 parts by weight of EPDM polymer. Alternatively, the oil can all be separately added to the high molecular weight EPDM polymer during the process of mixing of the polymers.

The ethylene-propylene elastomer which is of preferred use is an ethylene-propylene-diene terpolymer containing a small portion of a diene selected generally from among ethylidene norbornene, hexadiene-1,4, or, more exceptionally, from among methylene norbornene, dicyclopentadiene, and cyclo-octadiene-1,5. It is particularly surprising that it is advantageous to covulcanize with peroxides an ethylene-propylene-diene terpolymer into which a diene has been introduced to facilitate a sulfur vulcanization.

The amount of elastomer of the ethylene-propylene type to be used is between about 15 percent and about 60 percent by weight of the total elastomers, the balance being formed of ordinary highly unsaturated diene-based elastomers. A smaller amount—about 20 percent to about 30 percent by weight constitutes the preferable range—can be used with a terpolymer having a high content of macromolecules of high molecular weight, that is to say a terpolymer having a Mooney plasticity M/L (1+8') of more than about 100 at 100° C. The best proportion is between about 30 percent and about 40 percent by weight for an ordinary terpolymer containing a relatively large number of macromolecules of relatively low molecular weight, that is to say, having a Mooney plasticity of between about 50 and about 100 at 100° C. The use of an ethylene-propylene copolymer requires a higher proportion for the same effectiveness. However, one can use such a copolymer possibly mixed with a terpolymer.

The curative system employed when blends of highly unsaturated and lesser unsaturation rubbers are utilized is critical to good physical properties. This preferred system comprises a sulfur containing cure component selected from sulfur or a sulfur donor compound, at least one sulfur cure accelerator and at least one organic peroxide curative.

The sulfur donor compounds which may be employed in conjunction with or in the alternative to sulfur are well known to those skilled in the art of rubber compounding. Illustrative of such sulfur donor compounds are 2-(4-morpholinyldithio)benzothiazole, tetramethylthiuram disulfide, tetraethylthiuram disulfide, dipentamethylene thiuram hexasulfide, N,N'-caprolactam disulfide and the like.

The sulfur cure accelerators which may be employed include thioureas, such as N,N'-dibutylthiourea, 2-mercaptoimidazoline, tetramethylthiourea and the like; guanidine derivatives, such as N,N'-diphenylguanidine and the like; xanthates, such as zinc dibutylxanthate and the like; dithiocarbamates, such as zinc dimethyldithiocarbamate, zinc diethyldithiocarbamate, zinc dibutyldithiocarbamate, sodium diethyldithiocarbamate, and the like; thiuramsulfides, such as dipentamethylenethiuram disulfide, dipentamethylenethiuram hexasulfide, tetrabutylthiuram monosulfide, tetramethylthiuram monosulfide, tetraethylthiuram monosulfide, tetraethylthiuram disulfide and the like; heterocyclics, such as mercaptobenzimidazole, mercaptobenzthiazole, 2,2'-dibenzothiazyl disulfide, zinc 2-mercaptobenzothiazole and the like; and sulfenamides, such as N-oxydiethylene-2-benzothiazolesulfenamide, N-t-butylbenzothiazylsulfenamide, N-cyclohexyl-2-benzothiazylsulfenamide, N,N-diisopropyl-2-benzothiazylsulfenamide and the like. Moreover, mixtures of two or more sulfur cure accelerators may be employed in the curing agent. The preferred accelerators are thiazoles and sulfenamides, with sulfenamides being particularly preferred.

The peroxides which may be employed in this invention have an activation temperature which is below the decomposition temperature of the rubbers employed. Illustrative of such peroxides are benzoyl peroxide, dibenzoyl peroxide, 1,3-bis(t-butylperoxyisopropyl)-benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butylperoxyhex-3-yne, 4-methyl-2,2-di-t-butylperoxypentane and the like. Mixtures of two or more peroxides may also be employed. The preferred peroxides are dicumyl peroxide and 2,5-dimethyl-2,5-di-t-butylperoxyhexane.

The novel compounds of the invention may be used in combination with other antiozonants and less preferably with microcrystalline waxes as are commonly used to protect against static ozone attack. The other antiozonants which may be utilized include any of the commonly recognized paraphenylenediamine class of materials: N-phenyl-N'-(1,3-dimethylbutyl)-p-phenylenediamine; N-phenyl-N'-isopropyl-p-phenylenediamine; N-phenyl-N'-(1-methylheptyl)-p-phenylenediamine; N-phenyl-N'-cyclohexyl-p-phenylenediamine: mixed diaryl-p-phenylenediamines; N,N'-diphenyl-p-phenylenediamine; N,N'-di-beta-naphthyl-p-phenylenediamine: N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N-phenyl-N'-p-toluenesulfonyl-p-phenylenediamine; N-phenyl-N'-alkyl-p-phenylenediamine; 6-ethoxy-1,2-dihydro-2,2,4-trimethylquinoline; and nickel dibutyl dithiocarbamate.

A most preferred antiozonant to be used in combination with the novel triazine compounds of the invention is N-phenyl-N'-(1,3-dimethylbutyl)-p-phenylenediamine.

The highly unsaturated polymers to be protected may be formulated in conventional manner with the many usual compounding ingredients, for example, vulcanizing agents, accelerators, activators, retarders, antiozonants, antioxidants, plasticizing oils and softeners, fillers, reinforcing pigments and carbon blacks.

The novel compounds of the invention may be added to an unsaturated polymer at a level of from 0.1 to about 10 parts by weight per hundred parts by weight of rubber hydrocarbon (hereinafter PHR). For these purposes the polymer is assumed to be a natural or synthetic rubber. A more preferred addition level is about 1 to about 6 parts PHR. The most preferred level is from about 2 to about 4 parts PHR. When the triazine compounds of the invention are used in combination with other antiozonants such as the paraphenylenediamine class of materials, they may be added in a blend which totals to the ranges set forth above. The compounds of the invention may be blended with the other antiozonants at ratios ranging from 1:3 to 3:1. More preferred is a ratio range of 2:3 to 3:2. These ratios are meant to indicate the percentages are 40:60 to 60:40 where in all cases the triazine compounds of the invention are the first number of each ratio. It should be noted that in certain applications and with certain other antiozonants, the PHR ranges of antiozonant listed above may be varied in order to obtain the optimal protection. Reasonable experimentation must be undertaken in order to optimize the ratios and overall levels of the blend when the triazine compounds of the invention are blended with other conventional antioxidants and antiozonants.

The novel triazine compounds of the invention may be synthesized by a suitable synthesis route. The following synthesis examples are provided to illustrate a currently preferred method of manufacturing certain of the class of triazine compounds of the invention.

SYNTHESIS EXAMPLES

EXAMPLE 1:

2,4,6-tris(N-1,4-dimethylpentyl-p-phenylene diamino)-1,3,5-triazine

In a 3-liter, four-necked, round-bottomed flask equipped with a thermometer, a mechanical stirrer, a condenser, and a dropping funnel was placed 1500 ml of isopropanol. The ispropanol was cooled to $-10°$ C. and 184.4 grams (1 mole) of cyanuric chloride was added. To this stirred suspension was added 680 grams (3.3 moles) of 4-amino-N-(1,4 dimethylpentyl)aniline dropwise over 1 hour period keeping the temperature between $-10$ and $-5°$ C. Over 1 hour the reaction mixture was warmed to 30° C. then held for 16 hours at 30° C. The reaction mixture was refluxed for 1 hour at about 80° C. The reaction was followed by high pressure liquid chromatograph by observing the disappearance of the starting amine, and the conversion of the intermediate mono- and bis- substituted compounds to the final tris-substituted product. After cooling to 60° C. 240 grams (3 moles) of 50 percent sodium hydroxide solution was added dropwise over 1 hour period. The sodium chloride was removed by filtration at 40° C. The filtrate was cooled to 10° C. and the solvent was decanted off. The oily lower layer was extracted with water at 60° C. then crystallized from fresh isopropanol. The title compound was recrystallized from hexane and it melted at 128–132° C. The yield was 78.1 percent. The infrared spectrum was consistent with the structure. Relative area HPLC analysis of the product showed it to be 95.8 percent pure.

EXAMPLE 2:

2,4,6-tris(N-isopropyl-p-phenylenediamino)1,3,5-triazine

In a 2-liter, four-necked, round-bottomed flask equipped with a thermometer, a mechanical stirrer, a condenser, and a dropping funnel was placed 650 ml. of isopropanol. The isopropanol was cooled to $-5°$ C. and 36.8 grams (0.2 mole) of cyanuric chloride was added. To this stirred suspension was added a solution of 90 grams (0.6 mole) of 4-amino-N-isopropylaniline in 100 ml. of isopropanol dropwise over 1 hour period keeping the temperature between $-5$ and $0°$ C. Over ½ hour the reaction mixture was warmed to 30° C. then refluxed for 2 hours. The reaction was followed by high pressure liquid chromatography by observing the disappearance of the starting amine, and the conversion of the intermediate mono- and bis-substituted compounds to the final tris-substituted product. The reaction mixture was cooled, and allowed to stand overnight. The amine hydrochloride salt was neutralized by adding 96 grams (0.6 mole) of 25 percent sodium hydroxide solution over ½ hour period, and then refluxing the mixture for ½ hour. The title compound precipitated upon cooling and was isolated by filtration, washed with isopropanol and hot water (60° C.), M.P. 196–198° C. The yield was 75.2 percent. The infrared spectrum was consistent with the structure. Relative area HPLC analysis of the product showed it to be 95.3 percent pure.

EXAMPLE 3:

2,4,6-tris(N-cyclohexyl-p-phenylenediamino)-1,3,5-triazine

The procedure of Example 2 was repeated except on a 0.1 molar scale with 4-amino-N-cyclohexylaniline used to produce the title compound, M.P. 215–217° C. The yield was 89.9 percent. The infrared spectrum was consistent with the structure. Relative area HPLC analysis of the product showed it to be 90.1 percent pure.

EXAMPLE 4:

2,4,6-tris(N-sec-butyl-p-phenylenediamino)-1,3,5-triazine

The procedure of Example 2 was repeated except that 4-amino-N-sec-butylaniline was used to produce the title compound, M.P. 167–169° C. The yield was 90.8 percent. The infrared spectrum was consistent with the structure. Relative area HPLC analysis of the product showed it to be 94.6 percent pure.

EXAMPLE 5:

2,4,6-tris(N-1,3-dimethylbutyl-p-phenylene diamino)-1,3,5-trazine

In a 3-liter, four-necked, round-bottomed flask equipped with a thermometer, a mechanical stirrer, a condenser, and a powder funnel was placed a solution of 316.8 grams (1.65 moles) of 4-amino-N-(1,3 dimethylbutyl)aniline in 1500 ml of isopropanol. The temperature of the solution was adjusted to 30° C. and 92.2 grams (0.5 mole) of cyanuric chloride was added over ½ hour period keeping the temperature between 30 to 40° C. The reaction mixture was refluxed for 1-1/2 hours. The reaction was followed by high pressure liquid chromatography by observing the disappearance of the starting amine, and the conversion of the intermediate mono- and bis-substituted compounds to the final tris-substituted product. After cooling the reaction mixture to 60° C. 120 grams (1.5 moles) of 50 percent sodium hydroxide solution was added dropwise over 1 hour period. The sodium chloride was removed by filtration at 40° C. The filtrate was charged back to the reaction flask, and 250 ml of water was added dropwise. The title compound precipitated, and was removed by filtration, M.P. 124–127° C. The yield was 82.6 percent. The infrared spectrum was consistent with the structure. Relative area HPLC analysis of the product showed it to be 95.3 percent pure.

EXAMPLE 6:

2,4,6-tris(N-1-methylheptyl-p-phenylenediamino)-1,3,5-triazine

The procedure of Example 5 was repeated except on a 0.225 molar scale with 4-amino-N-(1-methylheptyl)aniline used to produce the title compound. After recrystallization from a 28 percent toluene hexane mixture the melting point of the product was 87–90° C. The infrared spectrum was consistent with the structure, and the relative area HPLC analysis of the product showed it to be 90.7 percent pure.

EXAMPLE 7:

2,4,6-tris(N-2,4-di-tert-butylcyclohexyl-p-phenylenediamino)-1,3,5-triazine

The procedure of Example 5 was repeated except on a 0.25 molar scale with 4-amino-N-(2,4-di-t-butylcyclohexyl)aniline used to produce the title compound, M.P. 147–152° C. The yield was 85.7 percent. The infrared spectrum was consistent with the structure.

EXAMPLE 8:

2,4,6-tris(N-2-sec-butylcyclohexyl-p-phenylenediamino)-1,3,5-triazine

The procedure of Example 5 was repeated except on a 0.25 molar scale with 4-amino-N-(2-sec-butylcyclohexyl)aniline used to produce the title compound. The product didn't crystallize, and was isolated as a pot residue, M.P. 122–130° C. The yield was 95.8 percent. The infra red spectrum was consistent with the structure, and the relative area HPLC analysis of the product showed it to be 86.6 percent pure.

ANTIOZONANT UTILITY EXAMPLES 9–24

The N-alkylarylenediamino triazine compounds of the invention function as outstanding antiozonants in rubber polymers with no migratory staining tendency evident at this time. The following examples demonstrate their utility in a variety of ozone and color stability test regimes. All tests utilize the triazines in vulcanized rubber compounds as are typical in the industry. The following test formulation is a typical rubber compound.

| TEST FORMULATION | |
|---|---|
| | Parts by Weight |
| Natural Rubber (SMR5CV) | 50.0 |
| Polybutadiene (cis 1,4 BR) | 50.0 |
| Carbon Black (N-326) | 50.0 |
| Zinc Oxide | 3.0 |
| Microcrystalline Wax | 1.5 |
| Stearic Acid | 1.0 |
| Aromatic Oil | 5.0 |
| Benzothiozole Sulfenamide | 1.0 |
| Sulfur | 2.0 |
| Antiozonant - Variable | Variable |

TABLE OF ANTIOZONANTS

Comparative A - N-phenyl-N'-(1,3-dimethylbutyl)-p-phenylenediamine (commercially available as Flexzone ™ 7F from Uniroyal Chemical Company)

Comparative B - mixed diaryl -p-phenylenediamine (commercially available as Novazone ™ AS from Uniroyal Chemical Company)

Example 1

2,4,6-tris(N-1,4-dimethylpentyl-p-phenylenediamino)-1,3,5-triazine

The foregoing test formulation was used for all test samples unless otherwise noted. The formulation is an approximation of a typical tire sidewall compound. The identity and level of the antiozonant are the variables to be evaluated in the subsequent examples.

The test formulation was utilized to make uncured test sheets by preblending the natural rubber and polybutadiene. Once blending was accomplished, all other ingredients except the sulfur and benzothiazole sulfenamide were added to form a nonproductive compound and in a subsequent mixing step, the foregoing ingredients were added. Tests sheets for the subsequent testing were cured in a platen press between heated plates for a time sufficient to achieve full cure. For the purposes of testing, a fifteen minute cure at 160° C. was normally utilized. The exact sample configuration of the test specimens for the ozone testing varies by the description of the ASTM method utilized. Reference is made to the ASTM test methods and such methods are incorporated herein by reference to abbreviate the required descriptive information regarding specimen preparation, test methods and test results.

OZONE TEST RESULTS

Ozone testing was conducted utilizing the standard test method of ASTM D1149-81 which is titled Rubber Deterioration - Surface Zone Cracking in a Chamber (Flat Specimen). This method covers the estimation of the resistance of vulcanized rubber to cracking when exposed to an atmosphere containing ozone. Rubber specimens are kept under a surface tensile strain and the ozone content in the test chamber is maintained at a 50 part per hundred million level in a 100° F. (38° C.) test chamber. A common designation for this test is the bent loop test method since the test specimen is placed under strain by having it clamped in a looped configuration in which varying degrees of strain and elongation result. This bent loop configuration is an extremely severe test configuration in which failure can be expected in a relatively few hours given the elevated temperature and high ozone atmosphere in which the test samples are placed.

TABLE I

| | STATIC OZONE TESTING (Results in Hours) | | |
|---|---|---|---|
| | EXAMPLE # | | |
| | 9 | 10 | 11 |
| | | Comparative | |
| ANTIOZONANT, 4 PHR | Blank | A | Example 1 |
| OZONE BOX - STATIC TEST | | | |
| Unaged | | | |
| No Cracks | — | — | 1128 |
| Cracked | 6 | 600 | — |
| 6 Months Aged | | | |
| No Cracks | — | — | 1080 |
| Cracked | 8 | 24 | — |
| 12 Month Aged | | | |
| No Cracks | — | — | 1040 |
| Cracked | 17 | 40 | — |

The prepared specimens were aged unstressed at room temperature at six months and twelve months and tested. Accordingly, three sets of test data are presented: unaged, six month and twelve month aged. The Example 9 column headed by the term blank denotes a formulation which contains no antiozonant protection. That unprotected sample broke in between six and seventeen hours of exposure depending upon the degree of aging which the specimen underwent prior to ozone exposure. Example 10 with Comparative A is the result of the conventional paraphenylenediamine (Flexzone 7F) added at four parts PHR and it cracked between 600 and as low as 24 hours of exposure. In Example 11, the rubber formulation protected by the substituted triazine of the invention shown in Example 1 survived between 1040 and 1128 (test concluded) hours for the various unaged and aged samples. It is clear from these results that the ozone protection afforded by the compounds of this invention are outstanding compared to the conventional antiozonants which are well known in the rubber field.

Table II shows the data for static ozone testing conducted in a similar manner to the testing shown in Table I. Test specimens dumbells, 3 mm by 50 mm were stretched 20% on specially designed racks and the degree of cracking was periodically recorded. Under this method, the test sample is subjected to the ozone atmosphere of 50 parts per hundred million at 100° F while under 20% elongation or extension. This additional degree of strain is a added characteristic of the sample preparation that is different than the test conducted as shown in Table I. All other details with respect to the test method are similar to those previously reported for the Table I results.

TABLE II

OZONE EXPOSURE 20% EXTENSION
(Results in Hours)

| ANTIOZONANT, 4 PHR | EXAMPLE # | | |
|---|---|---|---|
| | 12 BLANK | 13 COMPARATIVE A | 14 EXAMPLE 1 |
| Unaged | | | |
| No Cracks | — | 600* | 1128 |
| Cracked | 552 | — | — |
| 6 Months Aged | | | |
| No Cracks | — | — | 1080 |
| Cracked | 8 | 24 | — |
| 12 Month Aged | | | |
| No Cracks | — | — | 1040 |
| Cracked | 12 | 56 | — |

*Very slight cracking is visible

The unprotected blank test specimens of Example 12 survived between 12 and 552 hours depending on how long the sample was aged. The Comparative A composition when in an unaged condition at 600 hours showed very slight cracking. The six month and twelve month aged Example 13 showed cracking of the sample in between 56 and 24 hours. The compounds of this invention shown as example #14 again showed very dramatic improvements over the prior art antiozonant in providing protection which exceeded 1000 hours at these test conditions. This again demonstrates the superiority of the N-alkyl arylenediamino triazines of this invention over the conventionally used antiozonant of the paraphenylenediamine class.

Rubber articles must be protected against ozone when they are subjected to such exposure on outdoor weathering. One of the most difficult applications is on a tire where the vehicle remains out of doors and in ozone bearing atmosphere for an indefinite period of time. The true service conditions under which dynamic articles operate are not well duplicated by either static ozone tests such as those described in Table I and II nor are they well duplicated using dynamic test procedures such as DeMattia Flex Testing. In an effort to simulate a typical dynamic service condition the following test method is utilized. In the testing scheme, samples are mounted in southern facing test fixtures outdoors, exposed to the full outdoor environmental conditions as are present in Naugatuck, Connecticut. The samples are continuously flexed for 8 hours over approximately a 78° angle. After this flexing period the sample is then relaxed and remains in that relaxed, static condition for 16 hours. This protocol is repeated day after day until the deterioration as evidenced by the appearance and growth of cracks on the sample surface is observed and recorded. This intermittent flex/relaxation test is felt to correlate well with the actual conditions under which many articles operate, including belts, hoses and air springs. That is, the article is flexed for a number of hours to similar extensions as are accomplished during the flexing portion of the test. Then the article sits for a prolonged period of time in a static condition which is reproduced in the 16 hour static portion of the cycle. The test results are expressed in kilocycles. During the flexing portion of the test, the samples are flexed through a 78° angle at about 8.5 kilocycles per hour.

TABLE III

DYNAMIC OZONE TESTING
(Results in Kilocycles)

| ANTIOZONANT, 4 PHR | EXAMPLE # | | |
|---|---|---|---|
| | 15 Blank | 16 Comparative A | 17 Example 1 |
| 8 HOUR FLEX/ 16 HOUR STATIC RESULTS IN KILOCYCLES | | | |
| Unaged | | | |
| No Cracks | — | — | |
| Cracked | 1694 | 8264 | 8584 |
| ¹6 Months Aged | | | |
| No Cracks | — | 13896* | 16588* |
| Cracked | 2969 | — | — |
| ¹12 Month Aged | | | |
| No Crack | — | 7655* | 7655* |
| Cracked | 1165 | | |

¹Test ongoing
*Very, very slight cracking is visible
NOTE: No microcrystalline wax in Examples 15, 16, 17.

This dynamic flexing test uses rectangular specimens 12 mm by 76 mm with a 3 mm radius circular groove across the center of the specimen.

It is apparent from the results, that Example 15 which contained no antiozonant survived less than 3000 kilocycles under this test. Examples 16 and 17, which are protected by the paraphenylenediamine of the prior exhibited very significant improvements in the ability to withstand the outdoor aging. The triazine compound of the invention protected the sample of Example 17 with very nearly the same result as the paraphenylenediamine of Comparative A, which is generally considered to be one of the best antiozonants available for dynamic applicants.

ANTIOZONANT BLENDING

Examples 18-21

The triazine compounds of the invention, when compared to N-phenyl-N'-(1,3-dimethylbutyl)-p-phenylenediamine (Comparative A—Flexzone 7F) generally exhibit much better protection under static conditions and slightly poorer protection under severe dynamic conditions as judged by various laboratory test methods. However, it has been quite unexpectedly and surprisingly found that the dynamic protection properties may be greatly improved by blending the triazine compounds with conventional p-phenylene diamines. This is accomplished without sacrificing static condition ozone protection. Examples 18-21 below demonstrate this synergistic effect.

In Examples 18 and 19, the antiozonant of Example 1 was blended with two conventional antiozonants to evaluate the cumulative effect under both static and dynamic ozone testing conditions. The results were compared to unblended controls 20 and 21. The rubber formulation utilized was the same as the Test Formulation previously used in all test work except that the microcrystalline wax was deleted to assure that the antiozonant effect of the wax was not present to affect the results.

The Outdoor Dynamic Ozone test was conducted in a similar manner to the 8 hour flex/16 hour static test for Examples 12-14 of Table III except that the flexing at 8.5 kilocycles per hour is run continuously. There is no relaxation period. The test was ongoing, and therefore, no samples have yet reached the point of final cracking (failure).

The Ozone Box Static Test was run as described for Examples 9-11.

TABLE IV

| ANTIOZONANT BLEND TESTING | | | | |
|---|---|---|---|---|
| EXAMPLE # | 18 | 19 | 20 | 21 |
| ANTIOZONANT, PHR | | | | |
| Example 1 | 2.5 | 3.0 | — | 4.0 |
| Comparative A | — | 1.0 | 4.0 | — |
| Comparative B | 1.5 | — | — | — |
| OZONE BOX STATIC TEST (in hours) | | | | |
| No Cracks | 1016 | 1016 | — | 1016 |
| *VVS | — | — | — | — |
| Cracked | — | — | 216 | — |
| OUTDOOR DYNAMIC TEST | | | | |
| Continuous Flexing (in kilocycles) | | | | |
| No Cracks | 14583** | 14583** | 14583** | — |
| *VVS | — | — | — | 4231 |
| Cracked | — | — | — | — |

*VVS - First appearance of very, very slight cracks
**Test still underway last reading at 14583 kilocycles.

The results shown in Table IV for the Ozone Box Static Test show that Comparative A (Flexzone 7F) cracks after 216 hours (Example 20) while the compound of Example 1, used in Examples 18, 19, 21 alone or in combination with Comparative A or B afforded excellent protection as indicated by the fact that no cracks were evident after 1016 hours.

The Outdoor Dynamic Test results of Examples 18-20 show that the blends of Example 1 with Comparative A and B showed excellent protection under dynamic conditions. The blends of Examples 18 and 19 unexpectedly improved the Dynamic Ozone resistance compared to Example 21 which used the compound of Example 1 alone.

NON-STAINING CHARACTERISTICS

Examples 22-24

Samples specimens were prepared using the test formulation set forth previously but without wax. The test formulation was compounded, mixed and cured into flat test sheets for subsequent analysis of discoloration and staining characteristics. The specific testing was conducted in accordance ASTM-D925-83 Method C. The method C judges the degree of staining tendency of material by determining the amount of discoloration that occurs from the substrate material through a white lacquer coating which has been placed on the test sample. The test formulation previously set forth for all test samples of the invention was utilized. Once the test specimen was mixed and cured, it was coated with a veneer of white lacquer in accordance with the ASTM-D925 procedure. It was then exposed to a sunlamp light source in a suitable test chamber for a specified period of time. The Hunter Lab TM Colorimeter test apparatus was utilized to objectively determine the change in the color of the white lacquer during the four-hour exposure to the sun lamp. ASTM D2244-79 titled "Color Differences of Opaque Materials", reports a number of characteristics by the standard difference letters a, b, and L. Since the staining characteristics of normal antiozonants are very extreme, the L color scale is reported below. The L color scale is a scale from 0 to 100 with a 0 value being totally black and a 100 value being pure white. Therefore the higher the L value, the whiter the sample. The Test formulation of Example 22 was were prepared as a blank which contain no antiozonant. Example 24 contains the antiozonant of the invention described in Example 1, 2,4,6-tris(N-1,4-dimethylpentyl-p-phenylenediamino)-1,3,-5-triazine.

Example 23 uses the Comparative A material which is N-phenyl-N'-(1,3-dimethylbutyl)-p-phenylenediamine (Flexzone 7F, available from Uniroyal Chemical Company, Inc.). The test results of the three samples are presented below in Table V showing the Hunter "L" value after four hours of exposure.

TABLE V

| HUNTER "L" COLOR RESULTS | | |
|---|---|---|
| EXAMPLE | 22 | 23 | 24 |
| ANTIOZONANT | blank | Comparative A | Example 1 |
| | 87.9 | 32.6 | 81.5 |

The results shown above clearly show that the conventional paraphenylenediamine material of Example 23 shows significant staining (32.6) after 4 hours of exposure. But by contrast the test formula containing the compound of the invention of Example 1 had a color value of 81.5 which is very close to 87.9 value reported for the blank of Example 22. Thus, the compound of the invention is shown to have minimal diffusion staining which is an extremely unusual result for stabilizer of the amine class. Thus, the compounds of the invention can be advantageously utilized as antiozonants without the normal accompanying problems of diffusion staining and severe discoloration such as that shown in Comparative A results above. This class of materials could be described as non-staining antiozonants.

The compounds of the invention may be used to good advantage with antioxidants and antiozonants of the prior art in blends to enhance particular properties. While the substituted triazine compounds of the invention have herein described only as antiozonants, it is clear that the materials may also function as antioxidants for rubber, thus providing protection against oxidative degradation as well as ozone protection. It is noted that when used as an antioxidant, the levels are typically much lower per hundred parts of rubber hydrocarbon than when antiozonant protection is required.

Unsaturated polymers may be optionally protected against both oxidative and ozone degradation by blending the triazine compounds of the invention with conventional antioxidants. Many classes of phenolics, amines, etc. function as antioxidants. The Index of Commercial Antioxidants and Antiozonants, 3rd Edition published by The Goodyear Tire and Rubber Company lists materials commonly viewed as materials having antioxidant properties, and is incorporated herein by reference. Representative classes of such antioxidant materials are sterically hindered phenols, alkyl-substituted diphenylamines, aryl-substituted diphenylamines, aralkyl-substituted diphenylamines, naphthylamines, reaction products of a diarylamine and a ketone, mono-phenols, bisphenols, polyphenols, hydroquinone derivatives, and polymerized quinolines. The antioxidant system may contain one or more of these materials. Optimal levels of addition (PHR) for the antioxidants can be easily determined through routine experimentation and may vary widely depending upon the end use application.

DIENE RUBBER/EPDM COMPOSITIONS

Examples 25-33

The following examples illustrate the preferred utility of the triazines in tire exterior surface compounds containing blends of highly unsaturated rubber as well as EPDM which has lesser unsaturation.

Examples 25, 26 and 27 are comparative examples, not within the scope of the invention. Example 25 does not contain either the essential triazine component (I), of the invention or EPDM. Examples 26 and 27 have no triazine. These controls show cracking in the 72 hour ozone belt test (ASTM D-3395B-82) which is an extremely severe dynamic ozone test method in which the compound samples are vulcanized onto a fabric belt. The belt is run over a set of pulleys to induce a surface strain in an ozone chamber at 50 parts per hundred million of ozone at 100° F.

Examples 25 and 26 cracked during the ozone belt exposure while Example 27 showed an improved result (very, very slight cracking) due to the presence of the EPDM.

TABLE VI

| EXAMPLE # | 25 | 26 | 27 | 28 | 29 | 30 | 31 | 32 | 33 |
|---|---|---|---|---|---|---|---|---|---|
| Natural Rubber (SMR 5CV) | 60.00 | 60.00 | 60.00 | 60.00 | 60.00 | 60.00 | 60.00 | 60.00 | 60.00 |
| Polybutadiene (Cis 1,4-BR) | 40.00 | 30.00 | 10.00 | 10.00 | 30.00 | 25.00 | 25.00 | 25.00 | 20.00 |
| EPDM[1] | — | 10.00 | 30.00 | 30.00 | 10.00 | 15.00 | 15.00 | 15.00 | 20.00 |
| Carbon Black (N-326) | 45.00 | 45.00 | 45.00 | 45.00 | 45.00 | 45.00 | 45.00 | 45.00 | 45.00 |
| Naphthenic oil (Circosol 4240) | 12.00 | 12.00 | 22.50 | 22.50 | 12.00 | 12.00 | 12.00 | 12.00 | 12.00 |
| Zinc Oxide | 5.00 | 5.00 | 5.00 | 5.00 | 5.00 | 5.00 | 5.00 | 5.00 | 5.00 |
| Stearic Acid | 1.50 | 1.50 | 1.50 | 1.50 | 1.50 | 1.50 | 1.50 | 1.50 | 1.50 |
| Triazine Antiozonant[2] | — | — | — | 2.00 | 2.00 | 2.00 | 3.50 | 2.50 | 2.00 |
| Antiozonant[3] | — | — | — | — | 1.50 | 1.50 | 1.50 | 1.50 | 1.50 |
| 2(Morpholinothio)benzothiazole | 0.70 | 0.70 | 0.70 | 0.70 | 0.70 | 0.70 | 0.70 | 0.70 | 0.70 |
| Sulfur (80% oiled) | 2.25 | 2.25 | 2.25 | 2.25 | 2.25 | 2.25 | 2.25 | 2.25 | 2.25 |
| Mooney Scorch @ 132° C. (270° F.) ASTM-1646 | | | | | | | | | |
| Scorch Time (minutes) | 24.00 | 24.00 | 22.50 | 16.25 | 20.80 | 20.71 | 20.56 | 20.29 | 19.19 |
| Cure Rate (minutes) | 14.25 | 24.25 | 10.00 | 6.45 | 13.90 | 12.76 | 10.67 | 10.75 | 10.76 |
| Monsanto Fatigue Flex ASTM D-4482-85 KC to Failure | | | | | | | | | |
| Cured 18 Minutes @ 302° F. (aged 70 hours @ 100° C.) | 73.90 | 67.60 | 134.10 | 117.80 | 84.30 | 99.40 | 84.00 | 75.10 | 89.00 |
| DeMattia Flex Cracking | NR[4] | NR | NR | NR | 1236 | 1084 | 898 | 730 | 1354 |
| ASTM D-430-73 Method B Ozone Exposure ASTM D-1149-81 Bent Loop @ 50 pphm/38° C. (hours) | | | | | | | | | |
| OK | NR | NR | NR | NR | | | 1080 | 1080 | 1080 |
| VVS | | | | | 4 | 8 | | | |
| VS | | | | | 8 | — | | | |
| S | | | | | — | 96 | | | |
| C | | | | | 96 | 456 | | | |
| Dynamic Ozone Belt at 50 pphm ASTM D-3395B-82 @ 38° C., 72 continuous hours Crack Rating | C | C | VVS | OK | NR | NR | NR | NR | NR |

[1]Ethylene-propylene-5-ethylidene-2-norbornene terpolymer: E/P wt. ratio = 66/34; diene wt. % = 82; IV = 26 dl/g (decalin @ 135° C.); Mooney Viscosity (ML 1 + 4 @ 100° C.) = 65 on 75 phr oil extended polymer. All oil reported in naphthenic oil line below.
[2]2,4,6-tris(N-1,4-dimethylpentyl-p-phenlenethiamino)-1,3,5-triazine (See Example 1 for synthesis).
[3]Mixed diaryl-p-phenylenediamine (commercially available as Novazone ™ AS from Uniroyal Chemical Company, Inc.
[4]NR - not run.
[5]OK - no cracks; VS - very slight cracks; VVS - very, very slight cracks; S - slight cracks and C - cracked.

Example 28 dramatically illustrates the advancement in the art of rubber compounding. This compound, having both the essential triazine and the EPDM survived the severe dynamic ozone test with no cracking whatsoever.

Examples 29–33 illustrate the importance of the levels of addition of the essential EPDM and triazine components of the invention. Without being held to the scientific validity of the explanation, it is currently felt that optional protection can be obtained by having adequately high levels of either EPDM or the triazine compound. It is not felt to be necessary to have high levels of both to obtain exceptional dynamic ozone and fatigue properties. However, it is to be noted that good to excellent ozone resistance can be obtained in the lower ranges of either critical component compared to other non-staining ozone protection methods.

The effect of progressively higher levels of the triazine compound (of Example 1) is shown by looking at the ozone exposure (bent loop test) results of Examples 29 and 30 (two parts of triazine compound) which show cracks developing during the test. While the higher addition levels of Examples 31 and 32 show no cracking through the 1080 hours of the test.

The positive effect of progressively higher levels of EPDM is shown by comparing Examples 29, 30 and 33 which have progressively more EPDM. The level of ozone protection goes up with the EPDM level. The essential triazine compound is present at a constant level in these three examples. Thus, it can be concluded that desirable properties can be obtained by varying the level of lesser unsaturation elastomer (i.e. EPDM) and triazine compound.

Examples 34–41:

Examples 34, 35, 36, and 40 are comparative examples not within the scope of this invention. 34, 35 and 40 have no triazine antiozonant and 34 and 36 have no EPDM (lesser unsaturation polymer). The Monsanto Fatigue Flex Results are very critical results which have a good corelation to tire carcass life properties. Example 37 shows a flex fatigue value of 106 versus the much lower values of comparatives 34, 35, 36 which are all missing at least one key component of the invention.

The advantages of utilizing the preferred peroxide/sulfur combination curing system is shown by comparing the flex fatigue results of comparative example 35 (13.3) versus 39 and 41 (75 and 162.6). The cure system selection is another important factor. Peroxide/sulfur combination curing improves the flex fatigue results.

The importance of the triazine antiozonant is shown by comparing the flex fatigue value of comparative 35 (13.3) versus 37 (106). Example 41 shows optimum flex fatigue results with high molecular weight EPDM, triazine antiozonant and peroxide/sulfur cure system.

The static adhesion test results are consistently excellent for all stocks of the invention. A value of 10 is considered fully adequate adhesion results.

TABLE VII

| EXAMPLE # | 34 | 35 | 36 | 37 | 37 | 39 | 40 | 41 |
|---|---|---|---|---|---|---|---|---|
| Natural Rubber (SMR 5CV) | 50.00 | 50.00 | 50.00 | 50.00 | 50.00 | 50.00 | 60.00 | 60.00 |
| Polybutadiene (PBD 1203) | 50.00 | 20.00 | 50.00 | 20.00 | 20.00 | 20.00 | — | — |
| EPDM[1] | — | 30.00 | — | 30.00 | 30.00 | 30.00 | 40.00 | 40.00 |
| Carbon Black (N-326) | 50.00 | 50.00 | 50.00 | 50.00 | 50.00 | 50.00 | 50.00 | 50.00 |
| Naphthenic oil (Circosol 4240) | 10.00 | 30.00 | 10.00 | 30.00 | 30.00 | 30.00 | 36.00 | 36.00 |
| Zinc Oxide | 5.00 | 5.00 | 5.00 | 5.00 | 5.00 | 5.00 | 5.00 | 5.00 |
| Stearic Acid | 1.50 | 1.50 | 1.50 | 1.50 | 1.50 | 1.50 | 1.50 | 1.50 |
| Triazine Antiozonant[2] | — | — | 4.00 | 4.00 | 2.00 | 2.00 | — | 4.00 |
| N-t-butyl-2-benzothiazole sulfenamide | 1.00 | 1.00 | 1.00 | 1.00 | 1.00 | 0.85 | 0.85 | 0.85 |
| Dicumyl Peroxide (60%) | — | — | — | — | — | 1.00 | 1.00 | 1.00 |
| Sulfur (80%) | 2.00 | 2.00 | 2.00 | 2.00 | 2.00 | 1.50 | 1.50 | 1.50 |
| Mooney Scorch @ 132° C. (270 F.) ASTM 1646 | | | | | | | | |
| Scorch Time (minutes) | 24.00 | 28.75 | 27.50 | 28.00 | 30.00 | 22.50 | 14.25 | 20.75 |
| Cure Rate (minutes) | 12.50 | 10.50 | 7.50 | 5.50 | 5.75 | 15.25 | 12.75 | 9.00 |
| Monsanto Fatigue Flex ASTM-D-4482-85 KC to Failure | | | | | | | | |
| Cured 18 Minutes @ 150° F. (aged 70 hours @ 100° C.) | 4.50 | 13.30 | 34.60 | 106.00 | 63.60 | 75.00 | 104.9 | 162.6 |
| Static Adhesion @ 100° C. | * | 24.6 | * | 25.4 | 26.4 | 22.7 | 19.9 | 14.5 |
| Adhesion, kN/m | 19.6 | 21.6 | * | 23.6 | 26.9 | 20.5 | 15.3 | 15.7 |

[1] See Footnote 1, Table VI.
[2] See Footnote 2, Table VI.
*Test sample slipped out of one of the grips.

UTILITY IN DYNAMIC RUBBER ARTICLES

The 2,4,6 tris(N-alkyl-p-phenylenediamino)-1,3,5-triazines can be most advantageously used as a component in the outermost layers of a rubber article having an elastomeric body. The outermost layers are those exposed directly to an ozone-containing environment. There has been a long-standing need in the industry for a non-staining antiozonant material which can effectively protect a rubber article in both static and dynamic ozone environments. The following sections describe particular rubber articles which are most advantageously protected by the materials of the invention. In the wide variety of industrial rubber products which will be discussed, many, many different types of rubbers are utilized encompassing all of those previously disclosed as useful in the invention. It is to be noted that the triazine compounds of the invention can be utilized to enhance the ozone resistance of any polymer system which is being used in any conventional construction of the particular rubber article. A major step forward can be achieved by using the triazine antiozonants to enhance the protection of oil resistant polymers, most notably acrylonitrile-butadiene copolymers (NBR or nitrile rubbers). These types of polymers are highly oil resistant and, with the enhanced ozone resistance of this invention, can be used to replace neoprene (polychloroprene) in the many applications where neoprene is utilized for its moderate ozone and moderate oil resistance. It should also be noted that the various highly unsaturated polymers used in these industrial rubber products can also be further enhanced in terms of their ozone resistance and flex fatigue life through the blending of lesser unsaturated rubbers such as EPDM with the conventionaly highly unsaturated rubbers currently being utilized.

Belts

Among the various types of belts manufactured in the rubber industry, the power transmission belts are the types which are most improved using the materials and compounds described in this invention. The power transmission type generally described as a V-belt, as well as various positive drive and timing type belts, can be greatly improved by using these compositions. Rubber compounds which have exhaustively been described earlier and which contain compounds of structure (I) can be most beneficially used on the exterior surfaces of the belt structure. In V-belts, power transmission and timing belts they can replace the neoprene in the lower pulley engaging areas of the belt alternatively described as cushion stock, compression stock or pulley cover, depending on the belt structure. In order to better understand the utility in power transmission belts, a general description of the belt structure should be useful. The power transmisison belt has an elastomeric body which forms the majority of the belt. There is a geometrically defined neutral axis of most belts which pass over a plurality of pulleys. That neutral axis simply indicates that the area above the neutral axis is in tension when going over a pulley, and the area below the neutral axis plane is described as being in compression. Therefore, a typical power transmission belt would have a tension section and a compression section which are separated by the neutral axis plane. The major longitudinal reinforcements are completely conventional in the art are layers of cords, or fabric or steel cable which lie approximately on the neutral axis plane. The power transmission belt is comprised of one or more rubber compounds having either the same or different polymeric base rubbers. As indicated, the exterior envelope layers of a power transmission belt can be most beneficially enhanced using the rubber compounds of the invention. Also, the compression section which undergoes considerable flexing during the life of a belt can benefit from the enhanced resistance provided by use of the triazine and, particularly, when an EPDM rubber is further incorporated with the unsaturated diene-type rubber composition. These areas have conventionally utilized a neoprene (polychloroprene) base rubber which can now be replaced using lower cost, higher oil and solvent resistant polymers such as NBR and NBR in blends with other polymers such as SBR, natural rubber, EPDM, etc. Since the rubber composition used in the elastomeric body of the power transmission belt must be capable of embedding within it a plurality of layers of various types of reinforcing materials, adhesion of the rubber stocks to the adjacent layers is absolutely critical to the success of a belt building manufacturing operation. It is has been found that excellent adhesion levels can be achieved using the materials of the invention.

Conveyor Belting

Conveyor belts are used in a wide variety of environments and carry an infinite variety of payload. A conveyor belt is generally comprised of an elastomeric body formed of one or more rubber compounds having embedded in the elastomeric body a plurality of reinforcements in a position between an upper cover and a lower cover. It is the cover materials that can most advantageously utilize the rubber compositions using the triazine compound with various synthetic and natural rubbers. The characteristic of the triazine material of this invention carries with it the characteristic of being non-staining. This has limited the utility of many antiozonants in conveyor belts since they may come in contact with materials which can be stained through prolonged contact with the belt surface. Use of the non-staining compounds of structure (I) can allow enhanced ozone protection and flex fatigue life to be given to the conveyor belt product being manufactured. Details on specific types of constructions in conveyor belts can be gleaned from Rubber Manufacturers Association (RMA) specifications which deal with many types and constructions of conveyor belts. Such conventional structure and materials will not be recited in detail here and it is assumed that one of ordinary skill in the art can incorporate through reasonable trial and error the rubber polymers protected with the triazine compounds.

Air Springs

One of the most difficult applications in the industrial rubber products industry is the fluid spring, commonly called an air spring, which is used to either actuate or vibration dampen a particular mechanical device. Two basic types of air springs are the bellows-type and rolling lobe. A type of rolling lobe called a sleeve type is used in air adjustable shock absorbers for vehicles. The structures differ but in physical characteristics only, not in function. The materials required are very similar for both rolling lobe and bellows type air springs. During the useful life of an air spring, it may cycle millions and millions of times during which the internal air pressure will be varied causing deflection of the elastomeric sleeve or diagram of the air spring. A typical air spring is constructed using an upper and a lower retainer which are rigid structures through which air can be injected or exhausted from a pneumatic working chamber formed by the flexible member which spans the gap between the upper and lower retainers. This fabric reinforced, air impervious membrane is formed into either a straight sleeve or a molded bellows form and air tightly attached to the upper and lower retainers to form the pneumatic working cavity therebetween. The exact structrual similarities and differences between rolling lobe and bellows air spring are well known in the art and only generates structural detail on rolling lobe and bellows air springs is felt to be necessary to enable one skilled in the art to make optimum use of our invention. The fabric reinforced, air impervious membrane is the elastomeric body which can be dramatically improved by using the polymers stabilized with the materials of structure (I) of this invention. Neoprene has heretofore been commonly used due to its ability to resist ozone. Using the triazines of the invention the membrane can be improved using a material such as natural rubber which has excellent flex life capabilities but is attacked rapidly by ozone. Incorporating this non-staining antiozonant material into polymers such as natural rubber can allow for much greater flex life for the air spring flexible membrane. This is a dramatic step forward in the art of air springs manufacturing.

Hose

The vast variety of hose products will not be described at length except to indicate that the outer cover of most hose applications can benefit by utilization of the triazine compounds of the invention in at least this portion of the elastomeric body of the hose. A hose, of course, has an outer cover which is resistant to the environment in which the hose operates and an inner tube or liner which resists the particular fluid or material being conveyed within the hose. Between those two layers are positioned a plurality of reinforcement materials, which may be bias laid fabric, woven, or knitted fiber or filled rubber composite materials. Such hose constructional details will not be reviewed in depth but reference is made to the Rubber Manufacturers Association (RMA) hose specifications which deal at length and in depth with the constructional details of the various hose structures. It is the selection of materials with which this invention is concerned and, therefore, it is sufficient to describe that the conventionally used unsaturated and lesser unsaturation rubbers can be improved in the many ways including ozone resistance and flex fatigue resistance which have been previously described in this specification.

Many other rubber articles can benefit from the characteristics of the compound of structure (I) and these may include gaskets, bushings, motor mounts, window seals, weatherstripping, bridge bearing pads, rubber roofing membranes, geophysical membranes such as pond liners, shoe soles and heels, expansion joints, vibration joints, oil field parts and many other rubber articles.

In view of the many changes and modifications that may be made without departing from principles underlying the invention, reference should be made to the appended claims for an understanding of the scope of the protection afforded the invention.

What is claimed is:

1. A rubber article having an elastomeric body having an outermost layer comprising:
   (a) at least one ozone degradation-prone highly unsaturated polymer; and
   (b) a compound of structure (I), added in an amount effective to protect said unsaturated polymer against ozone attack,

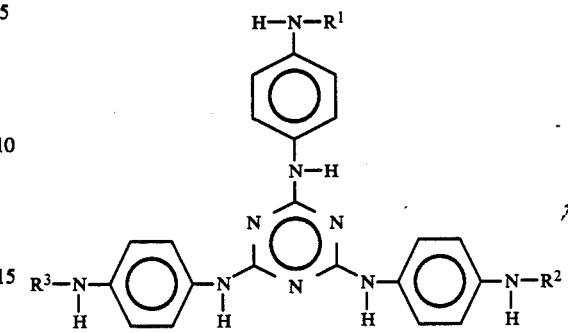

in which $R^1$, $R^2$, $R^3$ are radicals independently selected from a $C_3$–$C_{18}$ branched or linear alkyl, or a $C_3$–$C_{12}$ cycloalkyl or a $C_3$–$C_{12}$ cycloalkyl substituted with one or more $C_1$–$C_{12}$ alkyl groups.

2. The rubber article according to claim 1, wherein said elastomeric body is a hose.

3. The rubber article according to claim 1, wherein said elastomeric body is in the form of a weather strip.

4. The rubber article according to claim 1, wherein said elastomeric body is a shoe sole.

5. The rubber article according to claim 1, wherein said elastomeric body is a shoe heel.

6. The rubber article according to claim 1, wherein said elastomeric body is a cover over an electrical conductor.

7. The rubber article according to claim 1, wherein said elastomeric body is in the form of a conveyor belt.

8. The rubber article according to claim 1, wherein said elastomeric body is in the form of a V-belt.

9. The rubber article according to claim 1, wherein said elastomeric body is in the form of a power transmission belt.

10. The rubber article according to claim 1, wherein said elastomeric body is in the form of an air spring.

* * * * *